United States Patent
Labrot

(10) Patent No.: US 10,821,708 B2
(45) Date of Patent: Nov. 3, 2020

(54) PROCESS FOR MANUFACTURING AN AUTOMOTIVE GLAZING PANEL INTO WHICH AN OLED SCREEN IS INCORPORATED

(71) Applicant: SAINT-GOBAIN GLASS FRANCE, Courbevoie (FR)

(72) Inventor: Michael Labrot, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 174 days.

(21) Appl. No.: 16/067,268

(22) PCT Filed: Dec. 22, 2016

(86) PCT No.: PCT/FR2016/053631
§ 371 (c)(1),
(2) Date: Jun. 29, 2018

(87) PCT Pub. No.: WO2017/115036
PCT Pub. Date: Jul. 6, 2017

(65) Prior Publication Data
US 2019/0022985 A1    Jan. 24, 2019

(30) Foreign Application Priority Data
Dec. 30, 2015  (FR) ..................................... 15 63453

(51) Int. Cl.
*B32B 17/10* (2006.01)
(52) U.S. Cl.
CPC .. *B32B 17/10871* (2013.01); *B32B 17/10036* (2013.01); *B32B 17/1077* (2013.01);
(Continued)
(58) Field of Classification Search
CPC .................... B32B 17/10541; B32B 17/10036
(Continued)

(56) References Cited

U.S. PATENT DOCUMENTS

| 6,242,088 | B1 * | 6/2001 | Costa ...................... B32B 17/10 428/339 |
| 2005/0084659 | A1 * | 4/2005 | Dunkel ............. B32B 17/10174 428/209 |

(Continued)

FOREIGN PATENT DOCUMENTS

| DE | 10 2007 012571 A1 | 1/2008 |
| DE | 10 2013 003686 A1 | 9/2014 |

(Continued)

OTHER PUBLICATIONS

International Search Report as issued in International Patent Application No. PCT/FR2016/053631, dated Mar. 22, 2017.

*Primary Examiner* — Scott W Dodds
(74) *Attorney, Agent, or Firm* — Pillsbury Winthrop Shaw Pittman LLP

(57) ABSTRACT

A process for manufacturing a transport vehicle laminated glazing includes placing in succession to form a stack: a first glazing, a first lamination interlayer made of polymeric material, a second lamination interlayer made of polymeric material and, in a reserve produced in the latter, a flexible OLED element or screen, which is directly extended toward one edge of the glazing by a connection element that is connected thereto and that extends out of the stack, a third lamination interlayer made of polymeric material, and a second glazing, then in subjecting the resulting assembly to a vacuum at room temperature so as to remove air from the stack, then heating the resulting assembly to a temperature of at most equal to 85° C. while continuing to subject it to a vacuum.

23 Claims, 5 Drawing Sheets

(52) U.S. Cl.
CPC .. *B32B 17/10174* (2013.01); *B32B 17/10541* (2013.01); *B32B 17/10743* (2013.01); *B32B 17/10761* (2013.01); *B32B 17/10788* (2013.01); *B32B 17/10844* (2013.01)

(58) Field of Classification Search
USPC .................................................. 156/104, 106
See application file for complete search history.

(56) References Cited

U.S. PATENT DOCUMENTS

| | | |
|---|---|---|
| 2009/0219468 A1 | 9/2009 | Barton et al. |
| 2015/0303404 A1* | 10/2015 | Domercq ............ H01L 51/5246 257/40 |
| 2016/0159282 A1* | 6/2016 | Kurihara ........... B32B 17/10541 348/148 |
| 2016/0312523 A1* | 10/2016 | Miyasaka ................. E06B 9/24 |

FOREIGN PATENT DOCUMENTS

| | | |
|---|---|---|
| EP | 2 955 164 A1 | 12/2015 |
| FR | 2 578 485 A1 | 9/1986 |
| WO | WO 2014/083110 A1 | 6/2014 |

\* cited by examiner

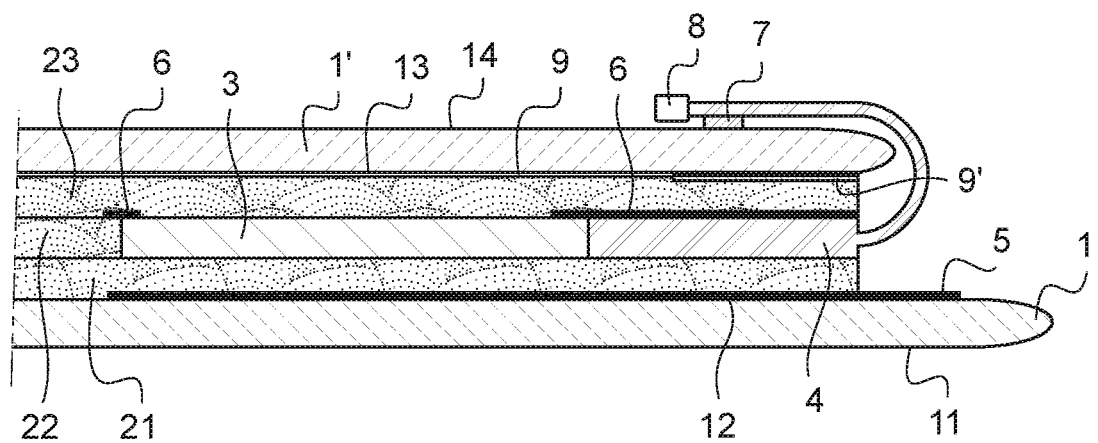
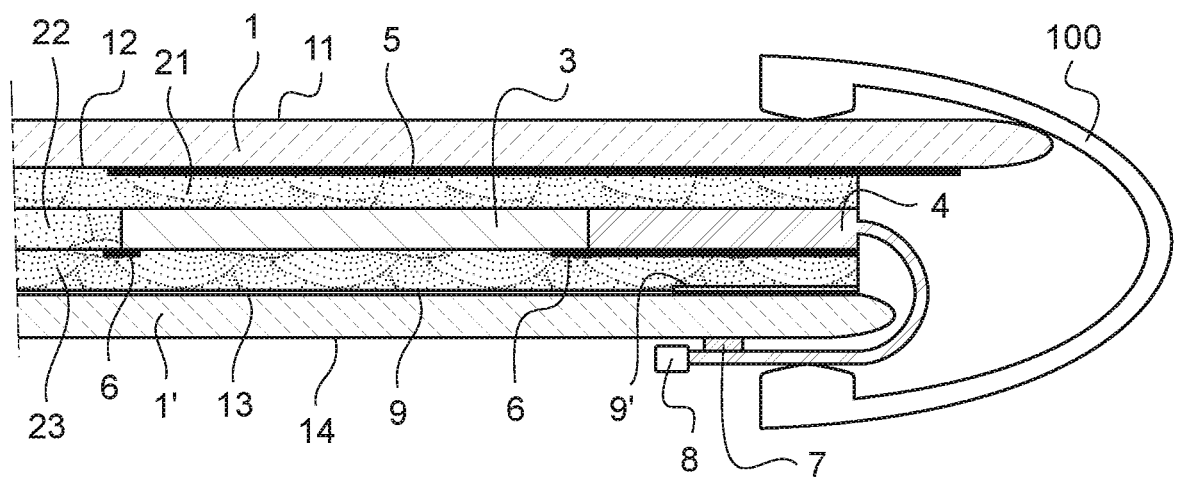

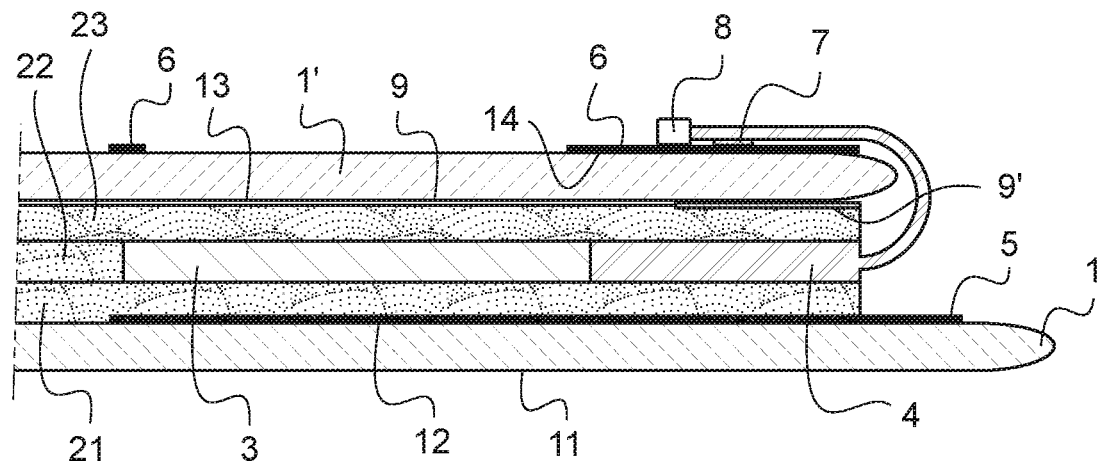
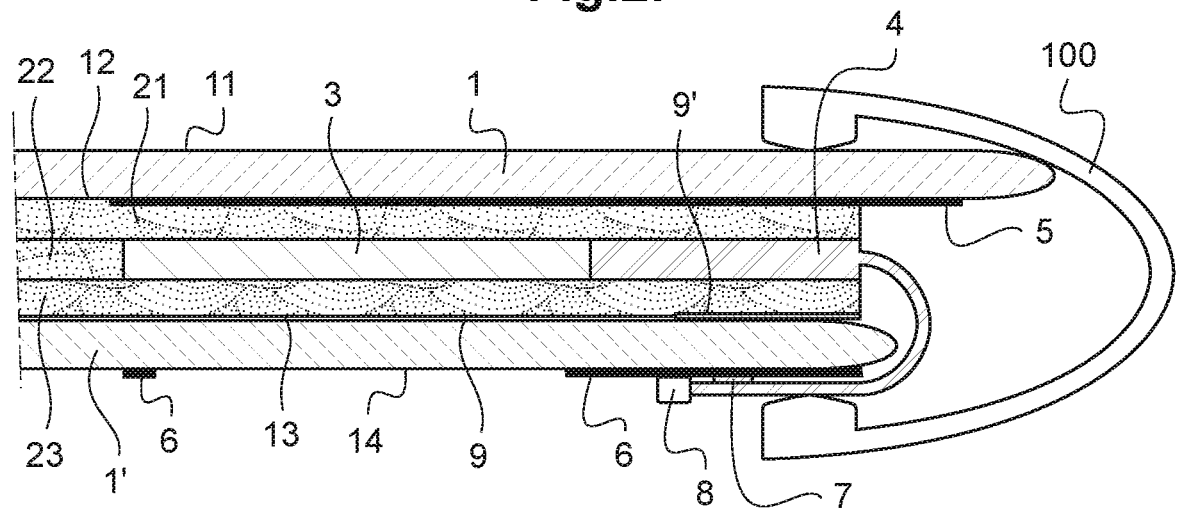

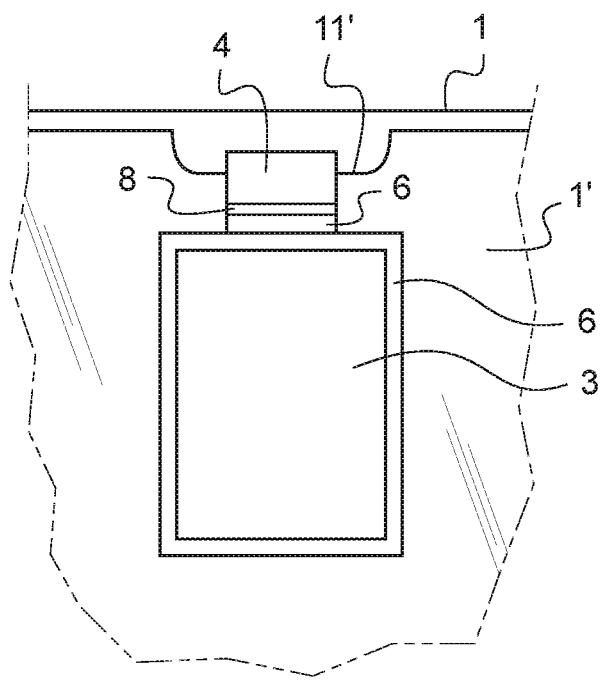
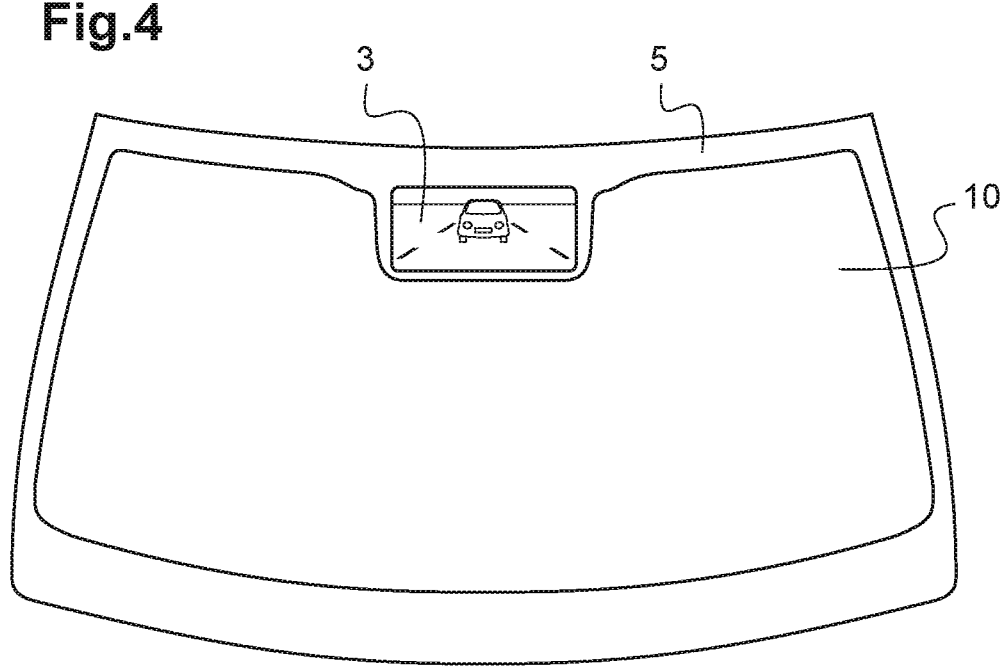

(12) United States Patent

PROCESS FOR MANUFACTURING AN AUTOMOTIVE GLAZING PANEL INTO WHICH AN OLED SCREEN IS INCORPORATED

CROSS-REFERENCE TO RELATED APPLICATIONS

This application is the U.S. National Stage of PCT/FR2016/053631, filed Dec. 22, 2016, which in turn claims priority to French patent application number 1563453 filed Dec. 30, 2015. The content of these applications are incorporated herein by reference in their entireties.

The present invention relates to the integration of an OLED or AMOLED element or screen into a transport vehicle laminated glazing.

An OLED screen may be integrated into all or some of the peripheral to central area of a laminated glazing provided that the OLED screen may be seen by the user. The OLED screen is flexible, relatively thin and fragile, just like the connecting elements to which it is connected.

An OLED screen would not be able to withstand the usual assembly conditions of a laminated glazing, which combine a step of heating to a temperature of never less than 90° C. up to 140° C., a step of placing the interior of the laminated structure under a negative pressure (vacuum) so as to evacuate air present between the various components (rough and irregular surface of the lamination interlayer before heating), and a step of applying a pressure to the exterior of the laminated structure in order to promote durable adhesive bonding and durable cohesion of the resulting assembly, but would rather be damaged if not completely destroyed.

The objective of the inventors was therefore to define and implement lamination conditions allowing the integrity and functionality of an OLED screen integrated into a transport vehicle laminated glazing to be completely and durably preserved. For this purpose, one subject of the invention is a process for manufacturing a transport vehicle laminated glazing comprising the steps consisting in:
  placing in succession to form a stack:
    a first glazing, made of mineral glass, with a first main face called F1 that is in particular intended to be exterior side of the vehicle, and an opposite second main face called F2, of thickness E1 of preferably at most 2.5 mm (above all for automobiles);
    a first lamination interlayer made of polymeric material, F2 face side;
    a second lamination interlayer made of polymeric material and, in a reserve produced in the latter, a flexible organic light-emitting diode display screen called the OLED element or screen, which is directly extended toward one edge of the glazing by a connection element that is connected thereto and that extends out of the stack;
    a third lamination interlayer made of polymeric material; and
    a second glazing, made of mineral glass, with a third main face called F3 interlayer side and an opposite fourth main face called F4, in particular intended to be interior side of the vehicle, of thickness E'1 of preferably of at most 2.2 mm (above all for automobiles); then in
  subjecting the resulting assembly to a vacuum at room temperature so as to remove air from the stack;
  heating the resulting assembly to a temperature of at most equal to 85° C., preferably at most equal to 80° C. and particularly preferably at most equal to 75° C. while continuing to subject it to a vacuum.

The duration of the last step comprising heating may for example be approximately 18 h in order to obtain a very strong and durable adhesive bond. However, it is possible to stop the pumping before the 18 h at 75° C., after a certain length of time determined case-by-case, then to remove the vacuum ring and finalize the assembly in a simple oven without vacuum ring.

The integrity of the OLED screen just like the connection element is never liable to be affected under the conditions of this process. A vacuum is obtained by any pumping means.

The OLED screen occupies a fraction of the area of the laminated glazing; its dimensions may vary and not limited. A plurality of OLED screens are liable to be placed within the laminated glazing, at various locations in its area, rather in proximity to its periphery because the connection elements are opaque and it is of course sought to preserve a maximum vision area. A plurality of connection elements may be associated with one and the same OLED element or screen.

If the thickness of the OLED element or screen is at most equal to 0.15 mm, it is possible according to the invention not to employ a second lamination interlayer, provided that the geometry of the OLED element or screen and its one or more connection elements allows it: OLED element or screen not too close to an edge of the laminated glazing, thin and narrow connection element(s). The thickness of the OLED element or screen is then adapted or compensated for invisibly by their flow.

The first and second glazings are made of clear or optionally tinted soda-lime-silica glass, and may comprise functional layers such as solar-radiation-reflecting, low-E, hydrophobic, self-cleaning photocatalytic, anticondensation/anti-fog layers, etc.

Any type of information may be displayed on the OLED screen: interior and exterior atmospheric conditions, view of the rear environment, view of the left-side/right-side environment, information relating to driving conditions and signposts, technical information relating to the transport vehicle for a windshield for example.

According to another preferred features of the process of the invention:
  during the step consisting in heating the resulting assembly while subjecting it to a vacuum, an additional exterior pressure is not simultaneously applied thereto as for example in an autoclave; this arrangement aims to limit the exterior mechanical forces to which the OLED screen and the connection element are subjected;
  the steps in which the resulting assembly is subjected to a vacuum are carried out by seal-tightly confining all of the periphery of the stack, such as by means of a peripheral elastomer envelope often called a "vacuum ring", and by pumping out the confined peripheral volume through a hole in this envelope; this embodiment will be described in more detail below;
  according to one alternative, the steps in which the resulting assembly is subjected to a vacuum are carried out by means of a vacuum chamber or a vacuum bag at least some of the walls of which are rigid so as to protect the connection element by preventing it from being subjected to physical contact under too great a mechanical stress;
  the first glazing is equipped beforehand, on a peripheral strip of its face F2, with an enamel layer; the function of the latter is generally to hide the adhesive bead bonding the glazing to the vehicle body, from exterior view; moreover, in the context of the invention, the enamel may advantageously extend so as to hide the (opaque) connection elements from exterior view, and optionally other elements such as will be seen below;

according to a first variant, a narrow peripheral fringe of the OLED screen (called the technical edge) and of the zone of the second interlayer that surrounds it and any connection element are equipped beforehand, on their face oriented toward the face F3, with a mask, or this mask is deposited before the placement of the third interlayer or even this mask, which may possibly be made of opaque polyethylene terephthalate (PET), is adhesively bonded to or forms part of the unit made up of the OLED screen and the connection element from its pre-assembly with a view to its storage, or forms part of a film that is adhesively bonded to this pre-assembled unit;

according to a second variant, the face F4 is equipped, facing a narrow peripheral fringe of the OLED screen and of the zone of the second interlayer that surrounds it, and facing all the area of the connection element, with a mask; these two variants are not necessarily mutually exclusive, and it is possible to imagine masking the technical edge of the OLED screen according to the first variant and masking the connection element according to the second, or vice versa, or double-masking of the technical edge of the OLED screen or of the connection element with two masks one according to each of the two variants; the function of the mask(s) is to hide inessential and unsightly portions of the device in order to leave visible from the interior only the useful portion thereof; any process adapted to the nature of the substrate according to the first or second variant may be employed: printing such as inkjet or screen printing, enamel such as on face F2, etc.; however, a mask according to the second variant must be wider than according to the first, in order to provide adequate masking even when the thickness of the second glazing is looked through at an angle. It is also necessary to take into account errors in the positions of the various components;

the face F3 is equipped with an electrically conductive layer and optionally with a current feed for feeding current thereto; this layer may consist of a solar-radiation-reflecting stack based on silver inter-alia, or of a heated stack/coating equipped for this purpose with its current feed; when the electrically conductive layer is a stack sold by the Applicant under the registered trademark Kappa®, for example, it may be covered directly with a mask masking the aforementioned technical edge of the OLED element or screen;

the thickness of the OLED screen is essentially the same as that of the second interlayer; only very small and practically insignificant thickness differences may be compensated for by the flow of the in particular thermoplastic lamination interlayers made of polymeric material; it is not excluded to cover or coat, if necessary, the OLED screen made of transparent polymeric material, in order to increase the thickness thereof to the value of that of the second interlayer or, if necessary, to sealably isolate the OLED element or screen with respect to oxygen, water and plasticizers liable to degrade it;

the connection element is a flexible printed circuit (FPC) partially covered or coated, where appropriate, with any material in order to increase the thickness thereof to a value essentially equal to that of the second interlayer, at least up to the edge of the laminated glazing, for the same reason mentioned regarding the thickness of the OLED screen;

the width of the connection element is essentially equal to that of the OLED element or screen up to the edge of the laminated glazing, so as to facilitate the insertion thereof into the lamination interlayer;

the connection element is curved (flexible) and adhesively bonded to the face F4 by means of an adhesive, in particular a pressure-sensitive adhesive;

the lamination interlayers made of polymeric material are chosen from polyvinyl butyral, ethylene vinyl acetate, polyurethane or ionomer resin alone or in blends of a plurality of varieties of one thereof and/or more than one thereof; the term "varieties" here refers to variations in the plasticizer content, linearity/amount of branching, average molecular mass of the molecules, etc.;

at least one of the first and third lamination interlayers made of polymeric material is advantageously high-flow, thereby facilitating the disappearance during the lamination of the surface structure presented by the interlayer before its implementation, or acoustic; an acoustic lamination interlayer includes a softer core layer having a higher plasticizer content, and that procures the property of sound insulation.

Other subjects of the invention consist in:

a transport vehicle laminated glazing in particular manufactured by a process such as described above, characterized in that the OLED screen (3) is opaque or transparent and has a thickness comprised between 0.15 and 0.8 mm, preferably at most equal to 0.7 mm and particularly preferably at most equal to 0.6 mm; a transparent OLED element or screen is preferably defined by a light transmittance (TL) of the zone of the laminated glazing comprising it at least equal to 70%, in which case this zone may be in the reduced zone A or B of a windshield according to European standard UN-ECE R43, in particular pages 138 and 139; in the present invention, the designation "opaque or transparent" is broader and also comprises all the intermediate situations in which the TL of the zone of the laminated glazing comprising the OLED element or screen is lower than 70%, in particular at most equal to 10% (tinted, etc.) and even to 5%, and the case where the OLED element or screen is opaque (zero TL for example by addition of a layer or paint—which is metallic, etc.—behind the PET plastic substrate bearing the OLED system) and, in these cases where the TL is lower than 70%, this zone is limited to the periphery (therefore outside of the reduced zone A and B of a windshield according to the aforementioned standard); and application of this transport vehicle laminated glazing as a windshield or side window in particular of an air, water or land vehicle such as an automobile, truck or train; this laminated glazing is curved or indeed planar.

The invention will be better understood in light of the description of the appended drawings, in which:

FIGS. 1a to 1f schematically show the steps of a first variant of the process of the invention;

FIGS. 2a to 2f schematically show the steps of a second variant of the process of the invention;

FIG. 3 is a partial schematic representation, seen from the interior of a transport vehicle, of a glazing according to the invention;

FIG. 4 is a schematic representation, seen from the interior of a transport vehicle, of a glazing according to the invention.

Figure 1A:
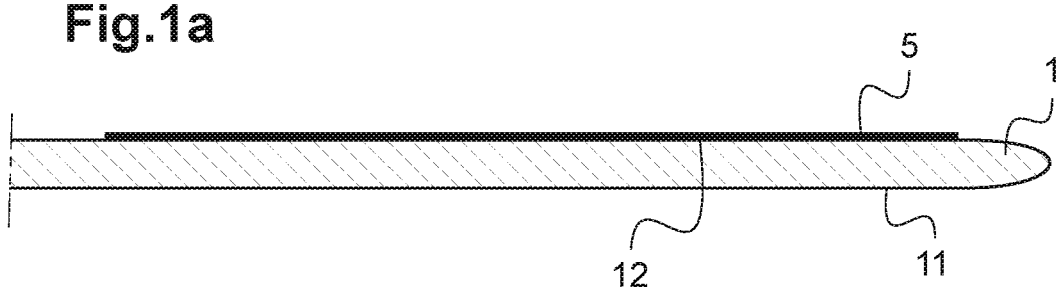

FIG. 1a shows a first sheet 1 of 2.1 mm thickness of soda-lime-silica float glass bearing a peripheral strip 5 of enamel on a face 12, called face F2, the other face 11 called face F1 of the sheet 1 being intended to make contact with the exterior atmosphere. The function of the enamel 5 is to hide, viewed from face F1, the adhesive bead securing the final laminated glazing to the vehicle body.

The sheet 1 and of course the other constituents of the laminated glazing may be curved, as in the case of an automobile windshield. It may include thin functional layers on either one of its faces F1 and F2 or indeed on both thereof: mention may be made of a hydrophobic or self-cleaning photocatalytic layer on face F1 and of a thin solar-radiation-reflecting layer or stack of such layers on face F2.

Figure 1B:
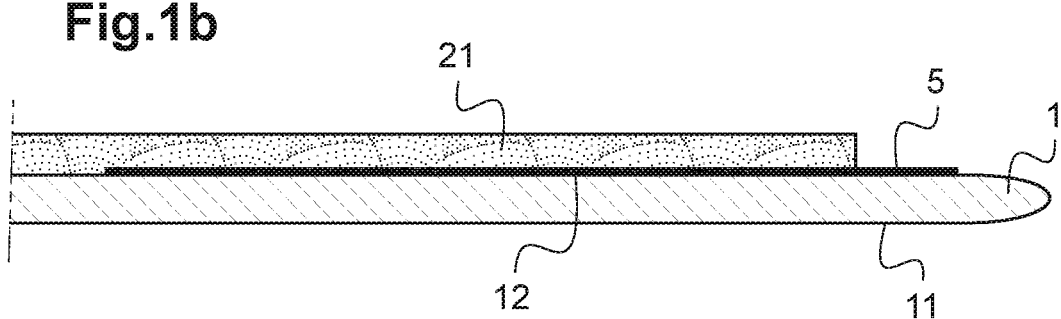

In FIG. 1b, a first sheet 21 of polyvinyl butyral (PVB) is placed on face F2 of the glass sheet 1, set back with respect to the edges thereof 1. A relatively high-flow variety of PVB or an acoustic variety of PVB is used, in particular a 0.81 mm thickness of the PVB sold by Eastman under the registered trademark Saflex®, or a 0.51 mm thickness of the PVB sold by Sekisui under the registered trademark S-LEC®.

Figure 1C:
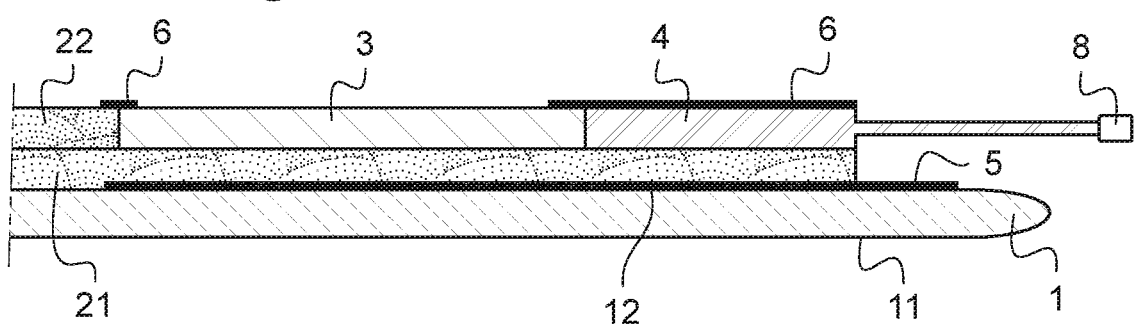

In FIG. 1c, a second sheet 22 of PVB is placed on the first sheet 21 of PVB and conformally to the surface thereof 21, and a flexible organic light-emitting diode display screen called the OLED screen 3, which is directly extended toward one edge of the glazing by a connection element 4 that is connected thereto and that extends out of the stack, is placed in a reserve produced in said sheet 22.

The PVB 22 may be a standard PVB of 0.38 mm thickness or a relatively high-flow PVB. The OLED screen 3 has a thickness of 0.4 mm. The portion of the connection element 4 included in the stack of the constituents of the laminated glazing is optionally covered or coated with any material in order to increase (if necessary) the thickness thereof to a value of 0.38 to 0.40 mm. The connection element 4 is a flexible printed circuit (FPC) adapted to implementation of 2560×1600 pixels (OLED screen). A flexible portion terminating in a connector 8 extends the FPC 4 out of the stack.

The entire area of the FPC 4 included in the stack and a narrow peripheral fringe of the OLED screen 3 and of the zone of the second interlayer 22 that surrounds it are covered, on their face opposite the sheet 21 of PVB, with an opaque pellicle 6 of polyethylene terephthalate (PET) that is possibly adhesively bonded to the unit made up of the OLED screen 3 and the FPC 4 from its pre-assembly with a view to its storage, or indeed forms part of a film that is adhesively bonded to this pre-assembled unit, a precut undesired portion of which film may then optionally be removed before assembly of the laminated glazing. The opaque pellicle 6 forms an opaque mask masking the FPC 4, the junction between the PVB 22 and the OLED screen 3, which may contain irregularities and defects, and the technical edges of the OLED screen 3 from view from the interior side of the laminated glazing, i.e. from the face of the laminated glazing opposite face F1. The pellicle 6 may also be an extension of the polymer material covering the OLED element or screen, i.e. be an integral portion thereof.

Figure 1D:
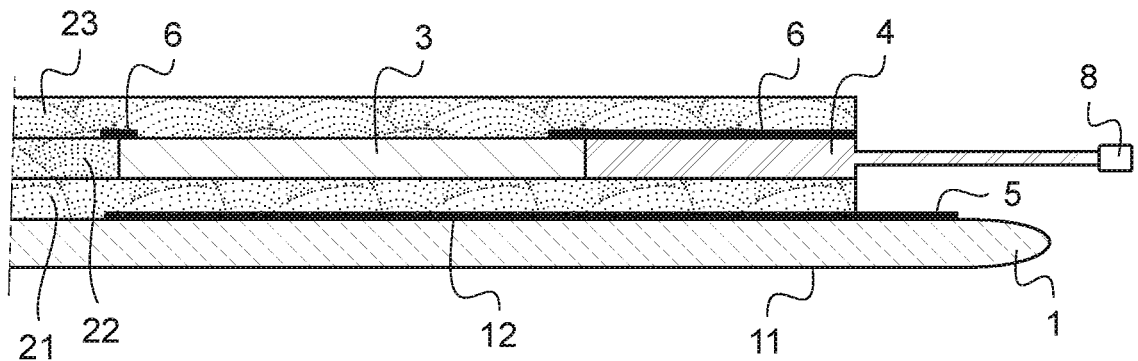

In FIG. 1d, a third sheet (23) of PVB that, preferably, is of the same nature as that of the first sheet (21) of PVB is placed. One at least of these first and third PVB sheets (21), (23) must be high-flow such as explained above, and preferably both are.

In FIG. 1e, a second sheet 1' of 1.6 mm thickness of soda-lime-silica float glass is placed, one face 13, called face F3, of which is oriented toward the other components of the laminated glazing and the other face 14, called face F4, of which is intended to be on the side of the passenger compartment of the transport vehicle. The face F3 is equipped with an electrically conductive stack 9 sold by the Applicant under the registered trademark Climacoat®. The stack 9 is connected to its current feed 9', which consists of a bus bar.

Before the assembly of the laminated glazing, the portion of the FPC 4 exterior to the stack is folded and adhesively bonded to the face F4 definitively by means of a glue 7 consisting of a pressure-sensitive adhesive.

FIG. 1f shows the method for assembling the laminated glazing in which a seal-tight envelope 100 made of an elastomer and equipped with an orifice (not shown) via which a vacuum will be created by pumping is fitted all the way around the peripheral portion of the stack. The seal-tight envelope 100 is often called a "vacuum ring". Therefore, to remove the air present within the stack, pumping is carried out cold for at least 30 min, in the present case 90 min, and then a temperature of 75° C. is applied for 18 h while continuing the pumping.

It will be noted that the edges of the vacuum ring 100 cover both some of the surface of the FPC 4 and a portion of the face F4 of the second glazing 1' from which the FPC 4 is absent: the FPC 4 is sufficiently thin that, whether the FPC 4 be present or absent, the green snake 100 is still perfectly able to provide its seal-tightness function.

An alternative to the latter step of pumping down may consist in placing the stack in a vacuum chamber or a vacuum bag at least some of the walls of which are rigid so as to protect the FPC 4 by preventing it from being subjected to physical contact under too great a mechanical stress. In this case the portion of the FPC 4 exterior to the stack may be folded and adhesively bonded to the face F4 only after the assembly by the means used to apply the vacuum and heat.

The thicknesses of PVB are nonlimiting: mention may be made of a second interlayer 22 of a thickness essentially equal to that of the OLED element or screen 3, for example one comprised between 0.15 and 0.76 mm, and of the same values for the first and third interlayers 21 and 23. We will more precisely mention, by way of thicknesses for the second interlayer 22, a PVB of 0.19 or 0.38 mm thickness and, for the first and third, a PVB of 0.19, 0.38 or 0.76 mm or a relatively high-flow or acoustic PVB of thickness at most equal to 0.90 mm.

In all the appended figures and in particular with reference to FIG. 1f, the OLED screen 3 is opaque. The enamel 5 on face F2 of the laminated glazing hides the OLED screen from exterior view, i.e. from face F1. However the scope of the patent also extends to a transparent OLED screen 3. In this case, the enamel 5 on face F2 must be absent opposite the surface of the OLED screen 3, except for level with a narrow peripheral fringe thereof, so as to hide, viewed from the exterior (face F1), the junction zone between the PVB 22 and the OLED screen 3, which may include irregularities and defects, and the technical edges of the OLED screen 3, but while leaving visible, from both faces of the laminated glazing, the central portion and almost all of the area of the transparent OLED screen 3.

The enamel 5 is also located facing the opaque FPC 4 so as to also hide it from exterior view (face F1).

In the absence of enamel 5 on these surfaces, provision may be made to achieve this function of masking from exterior view (face F1) by the fact that a narrow peripheral fringe of the OLED screen 3 and of the zone of the second sheet 22 of PVB that surrounds it and any connection element 4 are equipped beforehand, on their face oriented toward the face F2, with a mask (not shown) just like the mask 6 on their face oriented toward the face F3.

In the case of a transparent OLED screen 3 of useful area visible from both sides of the laminated glazing, the first sheet 21 of PVB constitutes a good protection of this useful area of the OLED screen 3 with respect to ultraviolet radiation. It is also possible to use a first sheet 21 of PVB with a higher content of UV blockers.

Figure 2A:
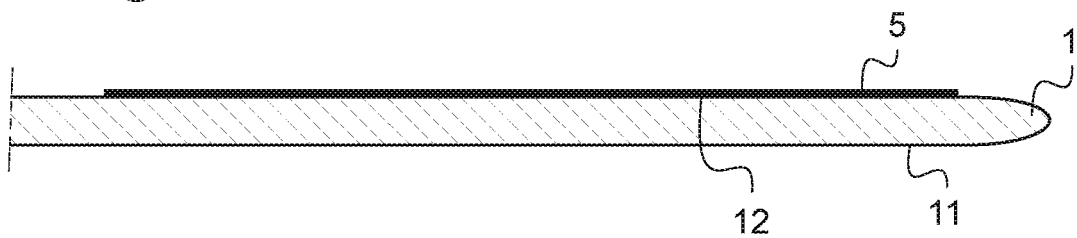
Figure 2B:
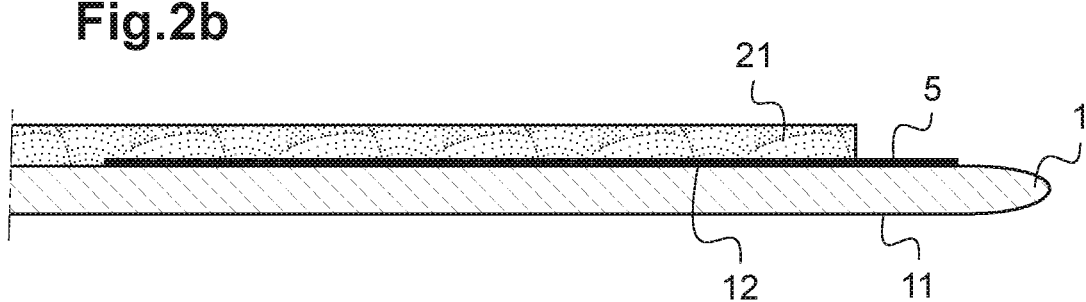
Figure 2C:
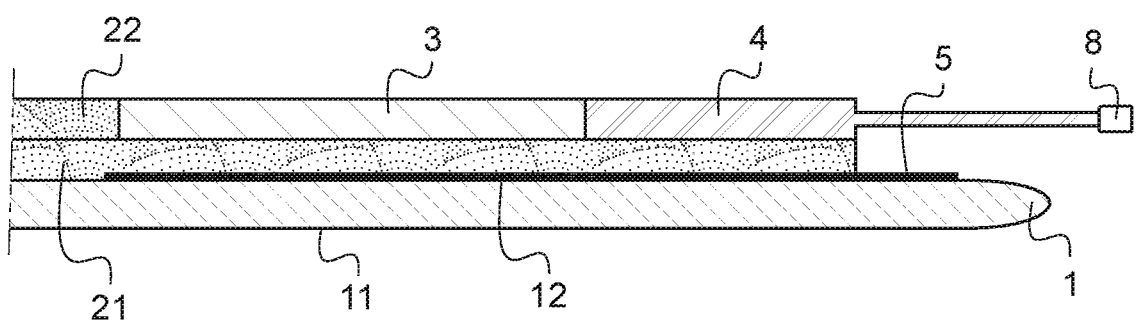
Figure 2D:
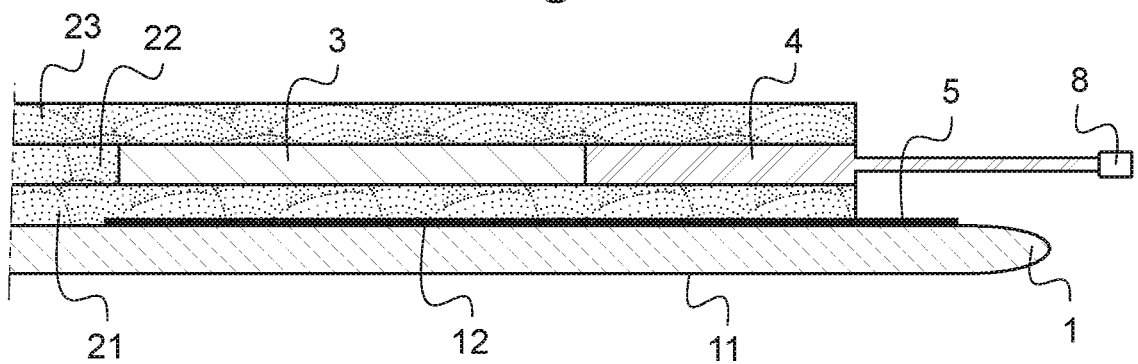

FIGS. 2a to 2f correspond to FIGS. 1a to 1f, from which they differ only in the movement of the mask 6, of identical function, to the face F4 (FIGS. 2e, 2f). It may be a question of any opaque layer, of a film of polymer material, of an enamel such as the enamel 5 on face F2, etc. The face F4 is then equipped, facing a narrow peripheral fringe of the OLED screen 3 and of the zone of the second sheet 22 of PVB that surrounds it, and facing all the area of the connection element 4, with a mask 6.

In FIG. 3, the portion of the laminated glazing according to the invention seen from the interior of a transport vehicle comprises an exterior mineral glass sheet 1 and an interior mineral glass sheet 1' the upper edge of which contains an indent 11'.

The OLED screen 3 is sandwiched between the exterior glass sheet 1 and the interior glass sheet 1'. The following may be seen: the mask 6 masking a narrow peripheral fringe of the OLED screen 3 and of the zone of the second sheet of PVB that surrounds it, and a portion near the OLED screen 3 of the mask 6 masking the FPC 4, the portion further from the OLED screen 3 of this mask 6 masking the FPC 4 being covered by the folded portion of the FPC 4, which portion is terminated by its connector 8. The FPC 4 could also advantageously be the same width as the OLED element or screen 3, so as to facilitate the insertion of both elements into the PVB.

The dimensions of the indent 11' are adapted to the FPC 4:
  width of the indent 11' larger than or equal to that of the FPC 4;
  depth of the indent 11' larger than or equal to the thickness of the FPC 4 because it is necessary to prevent the FPC 4 from being seen from the exterior in case of a visible edge. In practice the depth of the indent 11' is comprised between 1.5 mm-2 mm. The zone of the indent 11' is substantially devoid of lamination interlayer.

FIG. 4 shows a laminated windshield seen from the interior of the transport vehicle. The windshield comprises a central vision area zone 10 and a peripheral zone 5 of enamel framing the opaque OLED screen 3, that the enamel 5 hides from view from the exterior of the vehicle. On the OLED screen 3 may be seen behind the transport vehicle.

The invention claimed is:

1. A process for manufacturing a transport vehicle laminated glazing comprising:
   placing in succession to form a stack:
     a first glazing, made of mineral glass, with a first main face to be oriented on an exterior side of the vehicle, and an opposite second main face;
     a first lamination interlayer made of polymeric material and oriented toward the second main face side;
     a second lamination interlayer made of polymeric material and, in an opening produced in the second lamination interlayer, a flexible organic light-emitting diode (OLED) display element or screen, which is directly extended toward an edge of the stack by a connection element that is connected thereto and that extends out of the stack;
     a third lamination interlayer made of polymeric material; and
     a second glazing, made of mineral glass, with a third main face oriented toward the interlayer side and an opposite fourth main to be oriented on an interior side of the vehicle; then
   subjecting the resulting stack to a vacuum at room temperature so as to remove air from the stack; and
   heating the resulting stack to a temperature of at most equal to 85° C. while continuing to subject the stack to a vacuum,
   wherein steps in which the resulting assembly is subjected to a vacuum are carried out by means of a vacuum chamber or a vacuum bag at least some of the walls of which are rigid so as to protect the connection element by preventing the connection element from being subjected to physical contact under too great a mechanical stress.

2. The process as claimed in claim 1, wherein the first glazing is equipped beforehand, on a peripheral strip of the second main face with an enamel layer.

3. The process as claimed in claim 1, wherein a zone of the second interlayer surrounds the OLED element or screen, and wherein a narrow peripheral fringe of the OLED element or screen and of said zone and the entire connection element are equipped beforehand, on their face oriented toward the third main face, with a mask, or wherein the mask is deposited before the placement of the third interlayer.

4. The process as claimed in claim 3, wherein the mask is adhesively bonded to or forms part of a pre-assembly unit made up of the OLED element or screen and the connection element from its pre-assembly, or forms part of a film that is adhesively bonded to the pre-assembled unit.

5. The process as claimed in claim 1, wherein the fourth main face is equipped, facing a narrow peripheral fringe of the OLED element or screen and of a zone of the second interlayer that surrounds the OLED element or screen, and facing all the area of the connection element, with a mask.

6. The process as claimed in claim 1, wherein the third main face is equipped with an electrically conductive layer and optionally with a current feed for feeding current thereto.

7. The process as claimed in claim 1, wherein a thickness of the OLED element or screen is essentially the same as that of the second interlayer.

8. The process as claimed in claim 1, wherein during heating the resulting stack while subjecting it to a vacuum, an additional exterior pressure is not simultaneously applied thereto.

9. The process as claimed in claim 1, wherein steps in which the resulting stack is subjected to a vacuum are carried out by seal-tightly confining all of the periphery of the stack and by pumping out the confined peripheral volume.

10. The process as claimed in claim 1, wherein the first, second and third lamination interlayers, and made of polymeric material are chosen from polyvinyl butyral, ethylene vinyl acetate, polyurethane or ionomer resin.

11. The process as claimed in claim 1, wherein at least one of the first and third lamination interlayers, made of polymeric material is high-flow or acoustic.

12. The process as claimed in claim 1, wherein the first glazing has a thickness of at most 2.5 mm.

13. The process as claimed in claim 1, wherein the second glazing has a thickness of at most 2.2 mm.

14. The process as claimed in claim 1, wherein the temperature is at most equal to 75° C.

15. A process for manufacturing a transport vehicle laminated glazing comprising:
placing in succession to form a stack:
- a first glazing, made of mineral glass, with a first main face to be oriented on an exterior side of the vehicle, and an opposite second main face;
- a first lamination interlayer made of polymeric material and oriented toward the second main face side;
- a second lamination interlayer made of polymeric material and, in an opening produced in the second lamination interlayer, a flexible organic light-emitting diode (OLED) display element or screen, which is directly extended toward an edge of the stack by a connection element that is connected thereto and that extends out of the stack;
- a third lamination interlayer made of polymeric material; and
- a second glazing, made of mineral glass, with a third main face oriented toward the interlayer side and an opposite fourth main to be oriented on an interior side of the vehicle; then subjecting the resulting stack to a vacuum at room temperature so as to remove air from the stack; and
heating the resulting stack to a temperature of at most equal to 85° C. while continuing to subject the stack to a vacuum,
wherein the connection element is a flexible printed circuit partially covered or coated, where appropriate, with any material in order to increase the thickness thereof to a value essentially equal to that of the second interlayer, at least up to an edge of the laminated glazing.

16. The process as claimed in claim 15, wherein the connection element is curved and flexible and adhesively bonded to the fourth main face by an adhesive.

17. The process as claimed in claim 15, wherein a thickness of the OLED element or screen is essentially the same as that of the second interlayer.

18. The process as claimed in claim 15, wherein the first, second and third lamination interlayers, and made of polymeric material are chosen from polyvinyl butyral, ethylene vinyl acetate, polyurethane or ionomer resin.

19. The process as claimed in claim 15, wherein at least one of the first and third lamination interlayers, made of polymeric material is high-flow or acoustic.

20. A process for manufacturing a transport vehicle laminated glazing comprising:
placing in succession to form a stack:
- a first glazing, made of mineral glass, with a first main face to be oriented on an exterior side of the vehicle, and an opposite second main face;
- a first lamination interlayer made of polymeric material and oriented toward the second main face side;
- a second lamination interlayer made of polymeric material and, in an opening produced in the second lamination interlayer, a flexible organic light-emitting diode (OLED) display element or screen, which is directly extended toward an edge of the stack by a connection element that is connected thereto and that extends out of the stack;
- a third lamination interlayer made of polymeric material; and
- a second glazing, made of mineral glass, with a third main face oriented toward the interlayer side and an opposite fourth main to be oriented on an interior side of the vehicle; then subjecting the resulting stack to a vacuum at room temperature so as to remove air from the stack; and
heating the resulting stack to a temperature of at most equal to 85° C. while continuing to subject the stack to a vacuum,
wherein a width of the connection element is essentially equal to that of the OLED element or screen up to an edge of the laminated glazing.

21. The process as claimed in claim 20, wherein a thickness of the OLED element or screen is essentially the same as that of the second interlayer.

22. The process as claimed in claim 20, wherein the first, second and third lamination interlayers, and made of polymeric material are chosen from polyvinyl butyral, ethylene vinyl acetate, polyurethane or ionomer resin.

23. The process as claimed in claim 20, wherein at least one of the first and third lamination interlayers, made of polymeric material is high-flow or acoustic.

* * * * *